(12) United States Patent
Thomas et al.

(10) Patent No.: US 6,440,512 B1
(45) Date of Patent: Aug. 27, 2002

(54) HOSE CONSTRUCTION CONTAINING TERNARY BLEND OF POLYMERS

(75) Inventors: John Patrick Thomas, Bath, OH (US); Andre George Cook; Pascal Langlois, both of Granby (CA)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/428,351

(22) Filed: Oct. 28, 1999

Related U.S. Application Data

(60) Provisional application No. 60/106,975, filed on Nov. 4, 1998.

(51) Int. Cl.$^7$ .............................. B32B 1/08; F16L 11/00
(52) U.S. Cl. ................. 428/36.91; 428/35.7; 428/35.8; 428/36.9; 428/36.1; 428/36.2; 428/36.7; 138/123; 138/124; 138/125; 138/126; 138/140; 138/141
(58) Field of Search ................. 428/35.7, 36.1, 428/36.2, 36.6, 36.7, 36.91, 35.8, 36.9; 138/125, 126, 127–149

(56) References Cited

U.S. PATENT DOCUMENTS

| | | | | |
|---|---|---|---|---|
| 3,528,260 A | | 9/1970 | Binder ........................ 62/495 |
| 3,972,757 A | * | 8/1976 | Derderian et al. .......... 156/143 |
| 3,988,227 A | | 10/1976 | Eldred ................... 204/159.17 |
| 4,463,121 A | | 7/1984 | Gartland et al. ............ 524/291 |
| 4,633,912 A | | 1/1987 | Pilkington et al. .......... 138/132 |
| 4,685,090 A | | 8/1987 | Krevor ........................ 367/20 |
| 4,891,409 A | * | 1/1990 | Kuan et al. .................. 525/237 |
| 4,910,245 A | | 3/1990 | Flynn et al. ................. 524/298 |
| 4,978,703 A | | 12/1990 | Ainsworth et al. ......... 524/298 |
| 4,978,716 A | | 12/1990 | Flynn et al. ................. 525/195 |
| 5,286,795 A | | 2/1994 | Ainsworth ................... 525/195 |
| 5,341,863 A | | 8/1994 | Sandstrom et al. ......... 152/209 |
| 5,380,385 A | * | 1/1995 | Derroire et al. ............. 156/149 |
| 5,387,648 A | | 2/1995 | Ainsworth ................... 525/195 |
| 5,526,848 A | | 6/1996 | Terashima et al. .......... 138/125 |
| 5,622,210 A | | 4/1997 | Crisman et al. ............. 138/104 |
| 5,762,850 A | | 6/1998 | Pyle et al. ................... 264/209 |

FOREIGN PATENT DOCUMENTS

| | | |
|---|---|---|
| EP | 0472512 | 8/1991 |
| GB | 1066962 | 4/1967 |

OTHER PUBLICATIONS

European Search Report.

\* cited by examiner

*Primary Examiner*—Harold Pyon
*Assistant Examiner*—Marc Patterson
(74) *Attorney, Agent, or Firm*—Bruce J. Hendricks; John D. DeLong

(57) ABSTRACT

The present invention relates to a hose construction containing a ternary blend. The hose comprises (a) an inner core comprising a ternary blend of (1) from 60 to 85 parts by weight of a low density polyethylene; (2) from 10 to 20 parts by weight of chlorinated polyethylene, chlorosulfonated polyethylene and mixtures thereof; and (3) from 2 to 25 parts by weight of EPDM; (b) a layer of tensioned reinforcement; and (c) an elastomeric cover.

17 Claims, 1 Drawing Sheet

HOSE CONSTRUCTION CONTAINING TERNARY BLEND OF POLYMERS

This application claims the benefit of U.S. Provisional Application No. 60/106,975 filed Nov. 4, 1998.

BACKGROUND OF THE INVENTION

The present invention relates to a hose which is particularly suited for use in conveying chemicals. Because of such use, resistance to absorption of such chemicals is desired. One method of measuring the resistance to absorption of a chemical is to look at volume swell while being subjected to such chemical. While the industry is constantly striving to improve the chemical resistance of such hose, one cannot sacrifice the flexural properties while improving the chemical resistance because it may limit the hose's desired applications. Therefore, there exists a need in the industry to provide a hose with improved chemical resistance and excellent flexibility.

SUMMARY OF THE INVENTION

There is disclosed a hose comprising
(a) an inner core comprising a ternary blend of (1) from 60 to 85 parts by weight of a low density polyethylene; (2) from 10 to 20 parts by weight of a chlorinated polyethylene, chlorosulfonated polyethylene and mixtures thereof; and (3) from 2 to 25 parts by weight of EPDM;
(b) a layer of tensioned reinforcement; and
(c) an elastomeric cover.

DETAILED DESCRIPTION OF THE INVENTION

Figure 1:
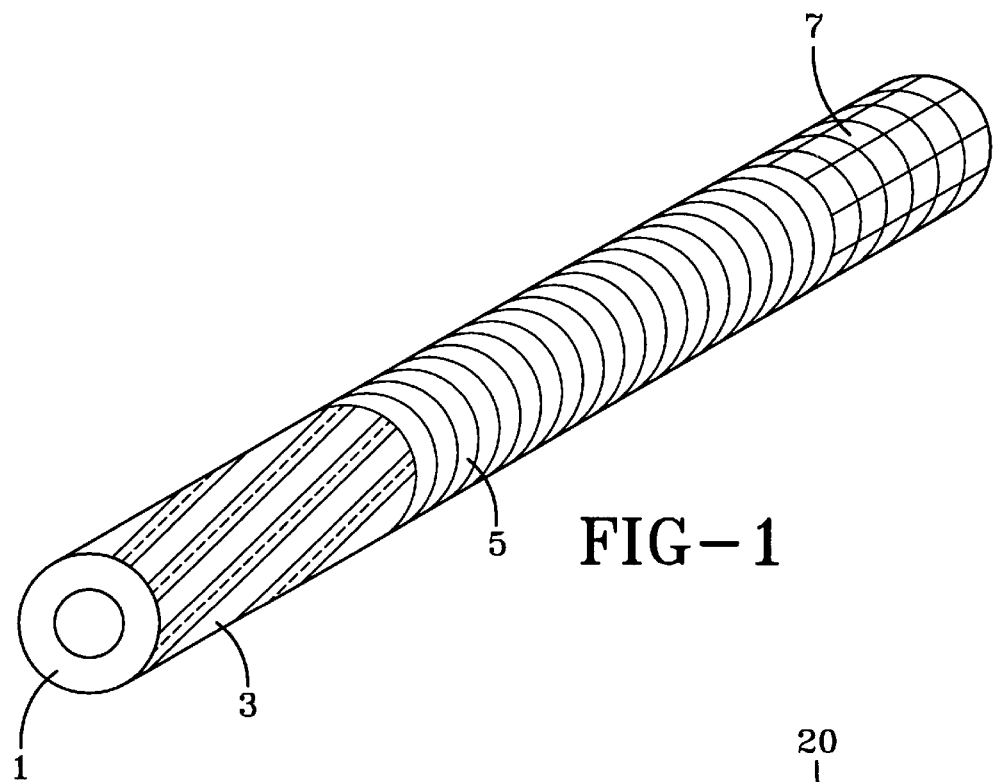
FIG. 1 is a perspective view of a hose according to the invention.

When a hose (1), for example, as shown in FIG. 1 is produced, the inner core (3) or tubular core of the present invention is formed from a ternary blend of (a) low density polyethylene; (b) chlorinated polyethylene, chlorosulfonated polyethylene and mixtures thereof; and (c) EPDM.

The low density polyethylene (also referred to herein as LDPE) is typically characterized by having a crystalline melt point of from about 85° C. to about 115° C. The crystalline melt point can be determined by ASTM Method No. D-2117. The density of the low density polyethylene ranges from about 0.91 to about 0.93 gm/cc. The density can be determined by ASTM Method No. D-792. It may have a melt index of, for example, about 0.2 to about 20 or possibly higher. The melt index can be determined by ASTM Method No. D-1238.

Commercially available low density polyethylenes which may be used in the present invention include but are not limited to those obtained from Union Carbide under the designation HFDE-4201 NT and The Exxon Chemical Company under the designations LD 113.09, LD 134.09, LD 200.48 and LD 400.09.

Chlorinated polyethylene starting materials suitable for purposes of the present invention are finely-divided particles which typically meet four physical property criteria. First, the materials have a weight average molecular weight of from about 40,000 to about 300,000. Second, the materials have a chemically combined chlorine content of from about 20 to about 48 percent by weight of polymer. Third, the materials have a 100 percent modulus, measured in accordance with ASTM Test D-412, from about 0.5 to about 4.8 MPa. Fourth, the materials have a heat of fusion of from about 0 to about 15 calories per gram, preferably from about 0 to about 10 calories per gram. Commercially available chlorinated polyethylenes that are suitable for use in the present invention include but are not limited to those obtained from DuPont/Dow under the designation Tyrin™ 3611P and Tyrin™ CM0136.

The chlorosulfonated polyethylene useful in this invention is typically a material having from about 20 to about 48 weight percent chlorine and from about 0.4 to about 3.0 weight percent sulfur. Typical preparations of chlorosulfonated polyethylene are disclosed in U.S. Pat. Nos. 2,586,363 and 2,503,252. Commercially available chlorosulfonated polyethylenes which may be used in the present invention include but are not limited to those obtained from E I DuPont de Nemours, Inc, under the designation Hypalon™, such as Hypalon 20, Hypalon 40, Hypalon 40 HS, Hypalon 4085 and Hypalon HPG 6525.

The EPDM rubber component may be an ethylene propylene norbornene terpolymer, ethylene propylene-1,4-hexadiene terpolymer, ethylene propylene dicyclopentadiene terpolymer and the like. Suitable EPDM rubbers that are commercially available and may be used in the present invention are marketed under the tradename Keltan™ by DSM, the Vistalon™ series of EPDM elastomers marketed by Exxon, the Nordel™ materials marketed by E I DuPont de Nemours Corporation, the Royalene™ resins marketed by Uniroyal and the Buna™ materials marketed by Bayer. Specific EPDM rubbers that are preferred include Uniroyal IM-7100 (Royalene 539), Uniroyal IM-7200 (Royalene 552) and Bayer EPM 306. The EPDM rubbers vary in ethylene content from about 45 to 70 parts by weight and in propylene content from about 30 to 55 parts by weight and the concentration of an unsaturated component may vary from 3 to 8 percent by weight.

The inner core (3) of the hose (1) of the present invention contains a ternary blend of (a) low density polyethylene; (b) chlorinated polyethylene, chlorosulfonated polyethylene and mixtures thereof; and (c) EPDM. The respective weight amounts of each component may range from (a) 60 to 85 parts by weight of a low density polyethylene; (b) from 10 to 20 parts by weight of chlorinated polyethylene, chlorosulfonated polyethylene and mixtures thereof; and (c) from 2 to 25 parts by weight of EPDM. The respective parts by weight of each of the three components in the ternary blend are based on 100 parts by weight of the ternary blend. Therefore, the respective parts by weight do not include the total weight of a compounded ternary blend including optional additives. The preferred weight amounts of each compound are (a) 70 to 80 parts by weight of low density polyethylene; (b) 14 to 18 parts by weight of chlorinated polyethylene, chlorosulfonated polyethylene and mixtures thereof; and (c) 5 to 15 parts by weight of EPDM.

The inner core (3) of the ternary blend of polymers may be formed by extrusion methods known to those skilled in the art. The thickness of this inner core (1) is important as excessively thin wall thicknesses or excessively thick wall thicknesses present flexibility or kinking problems or coupling compatibility problems of the final hose composite. It is believed that the inside diameter of the inner core (1) should range from 4 mm to 456 mm. Preferably, the inside diameter of the inner core will range from 6 mm to 102 mm.

The wall thicknesses of the inner core (1) should range from 0.5 mm to 8.0 mm, with a range of from 1.2 mm to 4.0 mm being preferred.

In addition to the ternary blend, the inner core (3) composition may contain conventional additives including reinforcing agents, fillers, peptizing agents, pigments, stearic acid, accelerators, crosslinking agents, antiozonants, antioxidants, processing oils, activators, initiators, plasticizers, waxes, prevulcanization inhibitors, extender oils and the like. Representative of reinforcing agents include carbon black, which is typically added in amounts ranging from about 5 to 200 parts by weight based on 100 parts by weight of total polymer (php). Preferably, carbon black is used in amounts ranging from about 35 to 120 php. Typical carbon blacks that are used include N110, N330, N332, N472, N550, N630, N642, N650, N762, N770, N907, N908, N990 and N991. In those instances, when the hose will be used to convey flammable fluids, electrically conductive blacks may be used. Noncarbon black fillers which may be used include talc, clay, calcium carbonate, silica and the like. Noncarbon black fillers, such as silica, may be used in an amount ranging from about 5 to 150 php. The preferred noncarbon black filler is silica. Oil dispersions containing such fillers may also be used. Organosilanes such as 3,3' bis(triethoxysilylpropyl) tetrasulfide may be used in amounts ranging from 0.1 to 20 phr. Suitable examples of such organosilanes are disclosed in U.S. Pat. No. 4,128,438 incorporated herein by reference in its entirety. Representative of the antidegradants which may be in the ternary blend composition include microcrystalline wax, paraffinic wax, monophenols, bisphenols, thiobisphenols, polyphenols, hydroquinone derivatives, phosphites, phosphate blends, thioesters, naphthylamines, diphenol amines, substituted and unsubstituted diaryl amine derivatives, diarylphenylenediames, para-phenylene diamines, quinolines and blended amines. Antidegradants are generally used in an amount ranging from about 0.1 php to about 10 php with a range of from about 2 to 6 phr being preferred. Representative of processing aids which may be used in the rubber composition of the present invention include activated dithio-bisbenzanilide, poly-para-dinitrosobenzene, xylyl mercaptans, aliphatic-naphthenic aromatic resins, polyethylene glycol, calcium stearamide, petroleum oils, vulcanized vegetable oils, pine tar, phenolic resins, synthetic oils, petroleum resins, polymeric esters and rosins. These processing oils may be used in a conventional amount ranging from about 0 to about 140 php. Representative of an initiators that may be used is stearic acid. Initiators are generally used in a conventional amount ranging from about 1 to 4 php. Additional additives which may be used as part of the cure package include calcium oxide, zinc oxide and magnesium oxide. These additives are conventionally used in amounts ranging from 0.1 to 25 php. Crosslinkers such as triallylisocyanurate and triazine-based materials may be used in amounts ranging from 0.25 to 6 php.

The peroxide useful in the ternary blend are those that are normally used in the industry. For example, peroxides such as dicumyl peroxide, [a,a'-bis(t-butylperoxide) diisopropylbenzene], benzoyl peroxide, 2,4-dichlorobenzoyl peroxide, 1,1-bis (t-butylperoxy)3,3,5-trimethylcyclohexane, 2,5-dimethyl-2,5-bis(t-butylperoxy) hexane, 2,5-dimethyl-2,5-bis (t-butylperoxy)hexyne-3, methylethyl ketone peroxide, cyclohexanone peroxide, cumene hydroperoxide, pinane hydroperoxide, p-menthane hydroperoxide, t-butyl hydroperoxide, di-t-butyl peroxide and n-butyl 4,4-bis(t-butylperoxy)valerate. The most preferred peroxide curative is dicumyl peroxide. From 1 to about 10 php of peroxide are utilized.

Another feature of the present invention is a layer of tensioned reinforcement (5). Such reinforcement (5) is known to those skilled in the art and may consist of spiraled, woven, knitted, cabled or braided reinforcement. Such reinforcements are typically derived from cotton, polyester, nylon, metal, rayon or aramid. When the reinforcement is metal, it may be steel, brass-coated steel, zinc-coated or galvanized steel. The reinforcement (5) is preferably spirally wound or woven fabric under sufficient tension to improve the strength of the hose structure. If the reinforcement is spiral-wound, the reinforcement layer (5) is preferably spirally wrapped at angles such that the flexing of the hose will not result in collapse or kinking. An angle such as from 0 to 89.9° with respect to the centerline of the hose may be used. Most preferably, a neutral angle of 54° 44' or below is used for the spiral wraps. When the reinforcement is a fabric, it is conventionally in the form of a rubber-impregnated fabric. Combinations of two or more types of reinforcement may be used.

The third element required in the hose of the present invention is an elastomeric cover (7). This cover (7) may be extruded or spirally wrapped over the underlying layer, which may be the tensional reinforcement layer (5) or, as discussed below, various other optional layers. The elastomers which may be used to form the cover for the hose of the present invention include those known to those skilled in the art such as chlorosulfonated polyethylene, chlorinated polyethylene, acrylonitrile-butadiene rubber/PVC blends, epichlorohydrin, EPDM, chloroprene, EVA and EVM. Preferably, the elastomer used in the cover is chlorinated polyethylene, EPDM or a NBR/PVC blend. The thickness of the elastomeric cover (5) is obviously depends upon the desired properties of the hose and the elastomer that is used. Generally speaking, the thickness of the elastomeric cover (5) will range from about 0.5 mm to about 4.0 mm, with a range of from 1.0 mm to being 2.5 mm being preferred.

Figure 2:
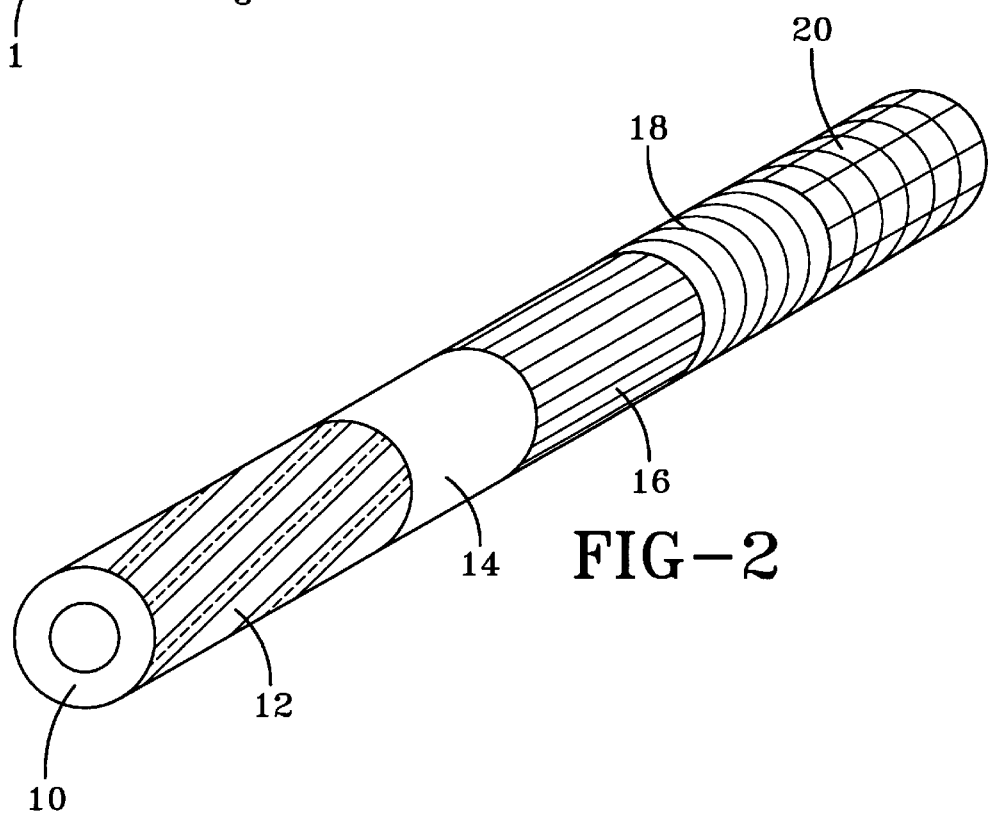
FIG. 2 is a perspective view of a hose according to the invention.

Whereas the ternary blend layer, reinforcement layer and elastomer cover layer have been discussed above as essential to the present invention, the hose of the present invention may have optional features. For example, when a hose (10), as shown in FIG. 2, is produced having the inner core (12) of a ternary blend, a barrier layer (14) may be incorporated into the hose (10) and is directly dispersed on the outside of the inner core (12). Such barrier layer may comprise one or more layers of films. Representative examples of such polymer which may be in film form include low density polyethylene, linear low density polyethylene, high density polyethylene, copolymer polypropylene, homopolymer polypropylene and mixtures thereof. Additional materials which may be used as the film include fluoroplastics and fluoropolymers including, for example, the TEFLON® and TEFZEL® family of fluoroplastics and fluoropolymers such as TEFLON PTFE (polytetrafluoroethylene), TEFLON FEP (fluorinated ethylene-propylene), TEFLON PFA (perfluoroalkoxy), TEFLON AF and TEFZEL polymers. Yet another material which may be used as a barrier layer includes a terpolymer derived from tetrafluoroethylene, herafluoro-propylene and vinylidine fluoride (THV). THV is commercially available from the 3M Company under the designations THV 200, THV 300, THV 400 and THV 500. The thickness of such barrier layer (14) may range of from about 0.025 to 0.30 mm, with a thickness of from 0.1 to 0.2 mm being preferred.

Dispersed on the outside of the barrier layer (14) may be a first layer (16) of another polymer. Such polymer may be comprised the same ternary blend of polymers as is used the inner core (12). The thickness of this first layer (16) which directly interfaces with the barrier layer (14) may vary. Generally speaking, the thickness of this first layer (16) will range of from about 0.2 mm to about 4.0 mm with a range of from about 0.4 mm to about 0.8 mm being preferred.

In accordance with this embodiment of FIG. 2, the tensioned reinforcement (18) is applied on the first layer (16) followed by the elastomeric cover (20) as the outside layer.

In accordance with another embodiment, the hose of FIG. 2 may comprise the inner core (12), a first intermediate elastomeric layer (14), the tensioned reinforcement layer (16), a second intermediate elastomeric layer (18) and the elastomeric cover (20). The elastomeric layers (14), (18) promote adhesion between the layers, hose consolidation, strength and flexibility. Conventional elastomers which may be used in these two layers include but are not limited to EPDM, natural rubber, styrene-butadiene rubber, styrene butyl acrylate rubber, chlorosulfonated polyethylene, chlorinated polyethylene, acrylonitrile-butadiene rubber/PVC blends, epichlorohydrin, chloroprene, EVA, EVM as well as mixtures of two or more of the above polymers. In a preferred embodiment, the composition of the first intermediate layer 14 and second intermediate layer (18) is different from the composition used in the elastomeric cover (20). The first intermediate elastomeric layer (14) and second elastomeric layer (18) may range in thickness of from 0.1 to 3.0 mm.

The following examples are provided to illustrate the instant invention and are not intended to limit the same. All parts are parts by weight, unless listed otherwise.

EXAMPLE 1

Two ternary blend compounds were prepared in a co-rotating twin screw extruder (Berstorff ZE 40A) wherein the extruder temperature was held between 112° C. to 130° C. and an average residence time of from 2 to 4 minutes was maintained. The extrudate temperature was typically in the 125° C. to 130° C. range. The extruder provided three zones for introducing the feed materials. Table I below lists the respective amount of each ingredient in parts by weight including the zone which the ingredient was added to the extruder. The extrudate was in the form of a sheet using a 102 mm×0.76 mm die. The twin screws were running 70 to 100 RPM to produce a line speed of 3.79 meters per minute. The sheet extrudate was air-cooled.

TABLE I

| Sample No. | 1 | 2 |
|---|---|---|
| Zone 1 | | |
| LDPE[1] | 78.8 | 73.9 |
| EPDM[2] | 4.8 | 9.7 |
| Zone 2 | | |
| CPE[3] | 16.4 | 16.4 |
| Silica[4] | 10 | 10 |
| Magnesium Dioxide | 0 | 1.8 |
| Dicumyl Peroxide | 1.8 | 2.7 |
| Triallylisocyanurate | 0.9 | 1.4 |
| Zone 3 | | |
| Dioctyl Phthalate | 5.2 | 10.3 |
| Diisononyl Phthalate | 5.2 | 0 |

[1]Union Carbide HFDE-4201 NT
[2]Uniroyal IM-7100 (Royalene ™ 539)
[3]Dupont/Dow Tyrin ® 3611P
[4]Obtained from PPG under the designation HiSil ™ 233

In accordance with the teachings of the present invention, two hose constructions were prepared. Each hose construction comprised an inner core of Sample 1 or Sample 2 compound.

The sheet extrudate of Sample 1 and Sample 2 was wrapped around a rotating mandrel to form the inner core tube having a 51 mm inner diameter and a wall thickness of 2.4 mm.

Next, a first intermediate elastomeric layer of EPDM, SBR and natural rubber was applied (0.6 mm) to the inner core tube. Rubber-reinforced Nylon 2/1000 cord was applied at an angle of 46°. A steel wire having a diameter of 1.5 mm was helically wound around the underlying nylon reinforcement so that a gap of 23 mm existed between the spirals. A second intermediate elastomeric layer of EPDM, SBR and natural rubber was applied (0.6 mm). Next, a second rubber-reinforced Nylon 2/1000 cord was applied at an angle of 46° followed by an EPDM rubber layer as the outer cover.

The outside surface of each uncured hose was wrapped by a nylon film and cured at approximately 152° C. After cure, the formed hoses were removed from the mandrels, washed and cut to finished length.

The two hoses prepared from Samples 1 and 2 were tested for various physical properties. As a Control, a hose marketed by The Gates Rubber Company under the designation 45 HW Mustang™ using the Gatron™ liner was also tested. Table II below provides the results from the testing. The samples were tested according to the test procedures described below.

Tensile and elongation was measured according to ASTM D-412. Shore A hardness was measured according to ASTM D-2240. Volume swell was measured according to ASTM D-471 which specifies a sample thickness of 1.3 mm to 2.3 mm; however, the Gates hose had a thickness ranging from 0.81 mm to 1.3 mm. Permeation was measured in a modified ASTM D-814 method which was modified by using a test period of 336 hours in place of 192 hours.

TABLE II

| Hose | Gates 45HW | Sample 1 | Sample 2 |
|---|---|---|---|
| Inner Tube Analysis % | | | |
| Total Polymer | 76.6 | 80.6 | 76.5 |
| Silica, SiO2 | 8.4 | 8.3 | 8.1 |
| Volatiles | 8.9 | 8.9 | 9.3 |
| Chlorine | 4.7 | 4.7 | 4.5 |
| Si | 3.9 | 3.9 | 3.8 |
| Isopropanol Extractable | 25.5 | 8.3 | |
| Specific Gravity | 1.0762 | 0.963 | 1.018 |
| Chemical Permeation Resistance mg per $m^2$ per 24 hrs | | | |
| Toluene | 21 | 5 | 6.6 |
| MEK | 1.5 | 0.5 | 1.05 |
| H2SO4, 70 hrs @ RT | | | |
| Volume Swell (%) | 11.8 | −0.72 | −1 |
| Toluene, 70 hrs @ RT | | | |
| Volume Swell (%) | 49.3 | 23.2 | 25.5 |
| Flexural Modulus, 0.6% strain | | | |
| Tan Delta, 20° C. | 0.082 | 0.051 | 0.071 |
| Tan Delta, 30° C. | 0.081 | 0.058 | 0.080 |
| E", 1 × 10$^6$, 20° C. | 3.603 | 3.292 | 3.459 |
| E", 1 × 10$^6$, 30° C. | 3.067 | 2.981 | 3.517 |

TABLE II-continued

| Hose | Gates 45HW | Sample 1 | Sample 2 |
|---|---|---|---|
| E', 1 × 10^8, 20° C. | 0.439 | 0.642 | 0.490 |
| E', 1 × 10^8, 30° C. | 0.380 | 0.516 | 0.438 |
| Original Properties | | | |
| Tension (psi) | 1831 | | 1619 |
| Elongation (%) | 358.9 | | 244.3 |
| Shore A | 85 | | 91 |
| Specific Gravity | 1.11 | | 1.04 |
| Sulfuric Acid, 98%, 7 days @ RT | | | |
| Tension (psi) | 1176 | | 1654 |
| % Change | −35.8 | | 2.2 |
| Elongation (%) | 196.3 | | 216.4 |
| % Change | −45.3 | | −11.4 |
| Shore A | 82 | | 89 |
| Change | −3 | | −2 |
| Volume Swell (%) | 13 | | −0.13 |
| Nitric Acid, 70%, 7 days @ RT | | | |
| Tension (psi) | 1309 | | 1565 |
| % Change | −28.5 | | −3.3 |
| Elongation (%) | 332.3 | | 229.1 |
| % Change | −7.4 | | −6.2 |
| Shore A | 79 | | 89 |
| Change | −6 | | −2 |
| Volume Swell (%) | 10.9 | | 2.35 |
| Sodium Hydroxide, 50%, 7 days @ RT | | | |
| Tension (psi) | 1844 | | 1672 |
| % Change | 0.7 | | 3.3 |
| Elongation (%) | 340.9 | | 233.3 |
| % Change | −5.0 | | −4.5 |
| Shore A | 85 | | 91 |
| Change | 0 | | 0 |
| Volume Swell (%) | 0.37 | | −0.08 |
| Toluene, 7 days @ RT | | | |
| Tension (psi) | 769.3 | | 965 |
| % Change | −58.0 | | −40.4 |
| Elongation (%) | 191.3 | | 108.6 |
| % Change | −46.7 | | −55.5 |
| Shore A | 68 | | 85 |
| Change | −17 | | −6 |
| Volume Swell (%) | 54.1 | | 25 |
| Methyl-t-butyl ether (MTBE), 7 days @ RT | | | |
| Tension (psi) | 968.7 | | 1125 |
| % Change | −47.1 | | −30.5 |
| Elongation (%) | 233.5 | | 148.6 |
| % Change | −34.9 | | −39.2 |
| Shore A | 79 | | 88 |
| Change | −6 | | −3 |
| Volume Swell (%) | 23.6 | | 12.4 |
| Methylethyl Ketone (MEK), 7 days @ RT | | | |
| Tension (psi) | 1498 | | 1384 |
| % Change | −18.2 | | −14.5 |
| Elongation (%) | 337.2 | | 201.8 |
| % Change | −6.0 | | −17.4 |
| Shore A | 83 | | 90 |
| Change | −2 | | −1 |
| Volume Swell (%) | −8.7 | | 4.85 |
| Butyl Cellusolve, 7 days @ RT | | | |
| Tension (psi) | 1566 | | 1451 |
| % Change | −14.5 | | −10.4 |
| Elongation (%) | 336.9 | | 210.8 |
| % Change | −6.1 | | −13.7 |
| Shore A (psi) | 83 | | 91 |
| Change | −2 | | 0 |
| Volume Swell (%) | 3.65 | | 2.21 |
| Unleaded Gasoline, 7 days @ RT | | | |
| Tension (psi) | 627.4 | | 996 |
| % Change | −65.7 | | −38.5 |
| Elongation (%) | 132 | | 115.8 |
| % Change | −63.2 | | −52.6 |
| Shore A | 75 | | 86 |
| Change | −10 | | −5 |
| Volume Swell (%) | 35.3 | | 20.4 |
| Dibutyl Phthalate (DBP), 7 days @ RT | | | |
| Tension (psi) | 1758 | | 1698 |
| % Change | −4.0 | | 4.9 |
| Elongation (%) | 358.2 | | 253.6 |
| % Change | −0.2 | | 3.8 |
| Shore A | 85 | | 91 |
| Change | 0 | | 0 |
| Volume Swell (%) | 5.85 | | 0.31 |

As can be seen in the above data, Samples 1 and 2 have greater permeation resistance than Gates 45 HW in toluene and MEK. Samples 1 and 2 have less change with respect to volume swell than Gates 45 HW in 98 percent wgt/wgt sulfuric acid and toluene.

As can be seen in the above data, Samples 2 has less or equal change than Gates hose with respect to ultimate tensile properties, Shore A hardness and volume swell in most of the chemicals listed.

EXAMPLE 2

(Control)

A ternary blend compound was prepared in a Banbury mixer using four stages of addition. The blend is considered a control stock due to the low level of low density polyethylene in the ternary blend. Table III below lists the respective amount of each ingredient in parts by weight. Sample 3 was single pass mixed in a Prepative Brabender with the following stages: Stage 1 premixed the silica, plasticizer and a portion of process aid at 8 rpm rotor speed and approximately 120° C. At stage 2, the EPDM and low density polyethylene was added at a time of 0.0 minutes, temperature of 120° C. and 8 rpm rotor speed. At Stage 3, the CPE was added at a time of 3.0 minutes, a temperature of 120–125° C. and the rotor speed was increased to 50 RPM. At Stage 4, the balance of the process aids and curatives were added at a time of 5.5 minutes, a mix temperature of 120–125° C. and a rotor speed of 50 RPM. The mix was dropped at a time of 7 minutes and a temperature not exceeding 125° C. The compound was milled to approximately 2 mm thickness.

The milled sheet was pressed by a platen and cured at 151° C. Test specimens were die cut from the cured sheet. The size of the test specimens were according to the ASTM test procedures. The test results for test specimens prepared from Sample 3 versus Sample 2 of Example 1 are listed in Table IV.

TABLE III

| Sample | Sample 3 |
|---|---|
| EPDM[1] | 27.0 |
| LDPE[2] | 50.4 |
| CPE[3] | 22.6 |
| Dioctyl Phthalate | 16.8 |
| Titanium Dioxide | 0 |
| Silica[4] | 29.4 |
| Magnesium Oxide | 2.5 |
| Dicumyl Peroxide | 3.5 |
| Paraffinic Wax | 5.0 |
| Calcium Stearamide | 2.0 |
| Triallylisocyanurate | 1.8 |

[1]Uniroyal IM 7100 (Royalene ™ 539)
[2]Union Carbide HFDE - 4201 NT
[3]Dupont/Dow Tyrin ® CM0136
[4]HiSil 233 obtained from PPG

TABLE IV

|  | Sample 2 | Sample 3 (Control) |
|---|---|---|
| Original Properties |  |  |
| Tension (psi) | 1619 | 1673 |
| Elongation (%) | 244.3 | 266.1 |
| Shore A | 91 | 92 |
| Specific Gravity | 1.04 | 1.03 |
| Sulfuric Acid, 98%, 7 days @ RT |  |  |
| Tension (psi) | 1654 | 1843 |
| % Change | 2.2 | 10.2 |
| Elongation (%) | 216.4 | 243.9 |
| % Change | −11.4 | 7.9 |
| Shore A | 89 | 89 |
| Change | −2 | −3 |
| Volume Swell (%) | −0.13 | 0.46 |
| Nitric Acid, 70%, 7 days @ RT |  |  |
| Tension (psi) | 1565 | 1872 |
| % Change | −3.3 | 11.9 |
| Elongation (%) | 229.1 | 272.5 |
| % Change | −6.2 | 20.5 |
| Shore A | 89 | 89 |
| Change | −2 | −3 |
| Volume Swell (%) | 2.35 | 3.86 |
| Sodium Hydroxide, 50%, 7 days @ RT |  |  |
| Tension (psi) | 1672 | 1821 |
| % Change | 3.3 | 8.8 |
| Elongation (%) | 223.3 | 254 |
| % Change | −4.5 | 12.3 |
| Shore A | 91 | 92 |
| Change | 0 | 0 |
| Volume Swell (%) | −0.08 | −0.11 |
| Toluene, 7 days @ RT |  |  |
| Tension (psi) | 965 | 1019 |
| % Change | −40.4 | −39.1 |
| Elongation (%) | 108.6 | 129.9 |
| % Change | −55.5 | −42.5 |
| Shore A | 85 | 85 |
| Change | −6 | −7 |
| Volume Swell (%) | 25 | 23.8 |
| Methyl-t-butyl ether (MTBE), 7 days @ RT |  |  |
| Tension (psi) | 1125 | 1226 |
| % Change | −30.5 | −26.7 |
| Elongation (%) | 148.6 | 168.7 |
| % Change | −39.2 | −25.4 |
| Shore A | 88 | 88 |
| Change | −3 | −4 |
| Volume Swell (%) | 12.4 | 12.8 |
| Methylethyl Ketone (MEK), 7 days @ RT |  |  |
| Tension (psi) | 1384 | 1408 |
| % Change | −14.5 | −15.8 |
| Elongation (%) | 201.8 | 210.1 |
| % Change | −17.4 | −7.1 |
| Shore A | 90 | 90 |
| Change | −1 | −2 |
| Volume Swell (%) | 4.85 | 5.22 |
| Butyl Cellusolve, 7 days @ RT |  |  |
| Tension (psi) | 1451 | 1687 |
| % Change | −10.4 | 0.8 |
| Elongation (%) | 210.8 | 254.7 |
| % Change | −13.7 | 12.6 |
| Shore A | 91 | 90 |
| Change | 0 | −2 |
| Volume Swell (%) | 2.21 | 0.63 |
| Flexural Modulus |  |  |
| Tan Δ, 20 C. | 0.071 | 0.0495 |
| 30 C. | 0.080 | 0.0539 |
| E", $1 \times 10^6$, 20° C. | 3.459 | 1.8362 |
| 30° C. | 3.517 | 1.7988 |
| E', $1 \times 10^8$, 20° C. | 0.490 | 0.37068 |
| 30° C. | 0.438 | 0.3374 |

Sample 3 is viewed as a Control because the level of LDPE ranges from 50.4 to 54.5 parts, which is well below that of the present invention. Comparing the properties of these Control test specimens versus the properties of Sample 2, one can see the material of Sample 2 has significantly improved chemical resistance with respect to volume swell while maintaining good flexibility.

What is claimed is:

1. A hose comprising
   (a) an inner core comprising a ternary blend of (1) from 60 to 85 parts by weight of a low density polyethylene; (2) from 10 to 20 parts by weight of a polyethylene selected from the group consisting of chlorinated polyethylene, chlorosulfonated polyethylene and mixtures thereof; and (3) from 2 to 25 parts by weight of EPDM;
   (b) a layer of tensioned reinforcement; and
   (c) an elastomeric cover.

2. The hose of claim 1 wherein said inner core comprises an inner core comprising a ternary blend of (1) from 70 to 80 parts by weight of a low density polyethylene; (2) from 14 to 18 parts by weight of a chlorinated polyethylene, chlorosulfonated polyethylene and mixtures thereof; and (3) from 5 to 15 parts by weight of EPDM.

3. The hose of claim 1 wherein a barrier layer is disposed between said inner core and said layer of tensioned reinforcement.

4. The hose of claim 1 wherein a first layer is disposed between said barrier layer and said layer of tensioned reinforcement.

5. The hose of claim 1 wherein said layer of tensioned reinforcement is selected from group of reinforcements that are spiraled, woven, knitted, cabled or braided.

6. The hose of claim 1 wherein said reinforcement is made from a material selected from the group consisting of metal, cotton, polyester, nylon, rayon and aramid.

7. The hose of claim 1 wherein said elastomeric cover is selected from the group consisting of chlorosulfonated polyethylene, chlorinated polyethylene, acrylonitrile-butadiene rubber/PVC blends, epichlorohydrin, EPDM, chloroprene, EVA and EVM.

8. The hose of claim 1 wherein the inside diameter of the inner core ranges from about 4 mm to 456 mm.

9. The hose of claim 1 wherein the wall of the inner core ranges from about 0.5 to 8.0 mm.

10. The hose of claim 4 wherein said first layer is comprised of said ternary blend.

11. The hose of claim 3 wherein the thickness of the barrier layer ranges of from about 0.025 to 0.30 mm.

12. The hose of claim 3 wherein said barrier layer is comprised of a material selected from the group consisting of low density polyethylene, linear low density polyethylene, high density polyethylene, copolymer polypropylene, homopolymer polypropylene, fluoroplastics, fluoropolymers and THV.

13. The hose of claim 1 wherein said elastomeric cover has a thickness ranging from about 0.5 to 4.0 mm.

14. The hose of claim 1 wherein said ternary blend is peroxide-cured.

15. The hose of claim 1 wherein said ternary blend contains from 5 to 150 php of silica.

16. The hose of claim 1 wherein the ternary blend comprises (1) low density polyethylene, (2) chlorinated polyethylene and (3) EPDM.

17. The hose of claim 1 comprising (a) an inner core comprising said ternary blend;

(b) a first intermediate elastomeric layer;

(c) a layer of tensioned reinforcement;

(d) a second intermediate elastomeric layer; and (e) an elastomeric cover.

* * * * *